(12) United States Patent
Faanes et al.

(10) Patent No.: US 8,601,236 B2
(45) Date of Patent: Dec. 3, 2013

(54) CONFIGURABLE VECTOR LENGTH COMPUTER PROCESSOR

(75) Inventors: Gregory J. Faanes, Chippewa Falls, WI (US); Eric P. Lundberg, Chippewa Falls, WI (US); Abdulla Bataineh, Chippewa Falls, WI (US); Timothy J. Johnson, Chippewa Falls, WI (US); Michael Parker, Chippewa Falls, WI (US); James Robert Kohn, St. Paul, MN (US); Steven L. Scott, Chippewa Falls, WI (US); Robert Alverson, Seattle, WA (US)

(73) Assignee: Cray Inc., Seattle, WA (US)

( * ) Notice: Subject to any disclaimer, the term of this patent is extended or adjusted under 35 U.S.C. 154(b) by 0 days.

(21) Appl. No.: 13/409,033

(22) Filed: Feb. 29, 2012

(65) Prior Publication Data

US 2012/0221830 A1 Aug. 30, 2012

Related U.S. Application Data

(63) Continuation of application No. 12/263,302, filed on Oct. 31, 2008, now abandoned.

(51) Int. Cl.
*G06F 15/00* (2006.01)

(52) U.S. Cl.
USPC .............................................................. 712/7

(58) Field of Classification Search
None
See application file for complete search history.

(56) References Cited

U.S. PATENT DOCUMENTS

| | | | |
|---|---|---|---|
| 6,295,597 B1 * | 9/2001 | Resnick et al. | 712/8 |
| 7,492,368 B1 * | 2/2009 | Nordquist et al. | 345/502 |
| 7,809,925 B2 * | 10/2010 | Mejdrich et al. | 712/7 |
| 2006/0212609 A1 * | 9/2006 | Zimmer et al. | 710/14 |

* cited by examiner

*Primary Examiner* — Andrew Caldwell
*Assistant Examiner* — John Lindlof
(74) *Attorney, Agent, or Firm* — Charles A. Lemaire; Jonathan M. Rixen; Lemaire Patent Law Firm, P.L.L.C.

(57) ABSTRACT

A processor core, comprises one or more vector units operable to change between a fine-grained vector mode having a shorter maximum vector length and a coarse-grained vector mode having a longer maximum vector length. Changing vector modes comprises halting all instruction stream execution in the core, flushing one or more registers in a register space, reconfiguring one or more vector registers in the register space, and restarting instruction execution in the core.

28 Claims, 3 Drawing Sheets

CONFIGURABLE VECTOR LENGTH COMPUTER PROCESSOR

CROSS-REFERENCE TO RELATED APPLICATIONS

This application is a continuation of U.S. patent application Ser. No. 12/263,302 entitled "CONFIGURABLE VECTOR LENGTH COMPUTER PROCESSOR" filed on Oct. 31, 2008 (now abandoned), which is incorporated herein by reference in its entirety.

FIELD OF THE INVENTION

The invention relates generally to vector computer processors, and more specifically in one embodiment to a configurable vector length computer processor.

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

BACKGROUND

Most general purpose computer systems are built around a general-purpose processor, which is typically an integrated circuit operable to perform a wide variety of operations useful for executing a wide variety of software. The processor is able to perform a fixed set of instructions, which collectively are known as the instruction set for the processor. A typical instruction set includes a variety of types of instructions, including arithmetic, logic, and data instructions.

In more sophisticated computer systems, multiple processors are used, and one or more processors runs software that is operable to assign tasks to other processors or to split up a task so that it can be worked on by multiple processors at the same time. In such systems, the data being worked on is typically stored in memory that is either centralized, or is split up among the different processors working on a task.

Instructions from the instruction set of the computer's processor or processor that are chosen to perform a certain task form a software program that can be executed on the computer system. Typically, the software program is first written in a high-level language such as "C" that is easier for a programmer to understand than the processor's instruction set, and a program called a compiler converts the high-level language program code to processor-specific instructions.

In multiprocessor systems, the programmer or the compiler will usually look for tasks that can be performed in parallel, such as calculations where the data used to perform a first calculation are not dependent on the results of certain other calculations such that the first calculation and other calculations can be performed at the same time. The calculations performed at the same time are said to be performed in parallel, and can result in significantly faster execution of the program. Although some programs such as web browsers and word processors don't consume a high percentage of even a single processor's resources and don't have many operations that can be performed in parallel, other operations such as scientific simulation can often run hundreds or thousands of times faster in computers with thousands of parallel processing nodes available.

Multiple operations can also be performed at the same time using one or more vector processors, which perform an operation on multiple data elements at the same time. For example, rather than instruction that adds two numbers together to produce a third number, a vector instruction may add elements from a 64-element vector to elements from a second 64-element vector to produce a third 64-element vector, where each element of the third vector is the sum of the corresponding elements in the first and second vectors.

In this example, the vector registers each hold 64 elements, so the vector length is said to be 64. The vector processor can handle sets of data smaller than 64 by using a vector length register specifying that some number fewer than 64 elements are to be processed, or can handle sets of data larger than 64 elements by using multiple vector operations to process all elements in the data set, such as by using a program loop.

The vectors in some further examples do not operate on elements that are sequential in memory, but instead operate on elements that are spaced some distance apart, such as on certain elements of a large array for scientific computing and modeling applications. This distance between elements in a vector is referred to as the stride, such that sequential words from memory have a stride of one, whereas a vector comprising every sixteenth element in memory has a stride of 16.

Vector processing provides other benefits to program efficiency, but at the cost of significant load or startup time relative to a scalar operation. Although the vectors must be completely loaded from memory before functions can be performed on the elements, other steps such as checking for variable independence need only be performed once for an entire vector operation. Instruction and coding efficiency are also improved with vector operations, as is memory access where the vector has a known or consistent memory access pattern. Vector processor design choices such as vector length consider these efficiencies and tradeoffs in an attempt to provide both good scalar operation performance and efficient vector operation.

SUMMARY

Some embodiments of the invention comprise a processor core that comprises one or more vector units operable to change between a fine-grained vector mode having a shorter maximum vector length and a coarse-grained vector mode having a longer maximum vector length. Changing vector modes comprises halting all instruction stream execution in the core, flushing one or more registers in a register space, reconfiguring one or more vector registers in the register space, and restarting instruction execution in the core.

DETAILED DESCRIPTION

In the following detailed description of example embodiments of the invention, reference is made to specific examples by way of drawings and illustrations. These examples are described in sufficient detail to enable those skilled in the art to practice the invention, and serve to illustrate how the invention may be applied to various purposes or applications. Other embodiments of the invention exist and are within the scope of the invention, and logical, mechanical, electrical, and other changes may be made without departing from the scope or subject of the present invention. Features or limitations of various embodiments of the invention described herein, however essential to the example embodiments in which they are incorporated, do not limit the invention as a whole, and any reference to the invention, its elements, operation, and application do not limit the invention as a whole but serve only to define these example embodiments. The following detailed description does not, therefore, limit the scope of the invention, which is defined only by the appended claims.

Vector processor architectures often include vector registers having a fixed number of entries, each vector register capable of holding a single vector. Vector functional units, such as an add/subtract unit, a multiply unit and a divide unit, and logic operation units are either dedicated to serving vector operations or are shared with scalar operations. Scalar registers are also used in some vector operations, such as where every element of a vector is multiplied by a scalar number. An example processor might have, for example, eight vector registers with 64 elements per register, where each element is a 64-bit word.

It is desirable in some applications to have vector lengths that are longer, while in other applications greater performance could be achieved if vector lengths were shorter or if the processor functioned more like a scalar processor. One embodiment of the invention seeks to address problems such as this by providing a reconfigurable processor core, such as where a more vectorized and a less vectorized configuration are available within the same processor core and can be selected to improve application execution efficiency.

In one such example, a processor chip contains 32 cores, where each core is capable of operating in either a vector threaded mode supporting four streams having a maximum vector length of 16, or a scalar threaded mode supporting 32 streams of a maximum vector length of one. Each mode has the same instruction set architecture, same instruction issue rate, and same instruction processing performance, but will provide different application performance based on the parallelization or vectorization that can be achieved for a given application.

Figure 1:
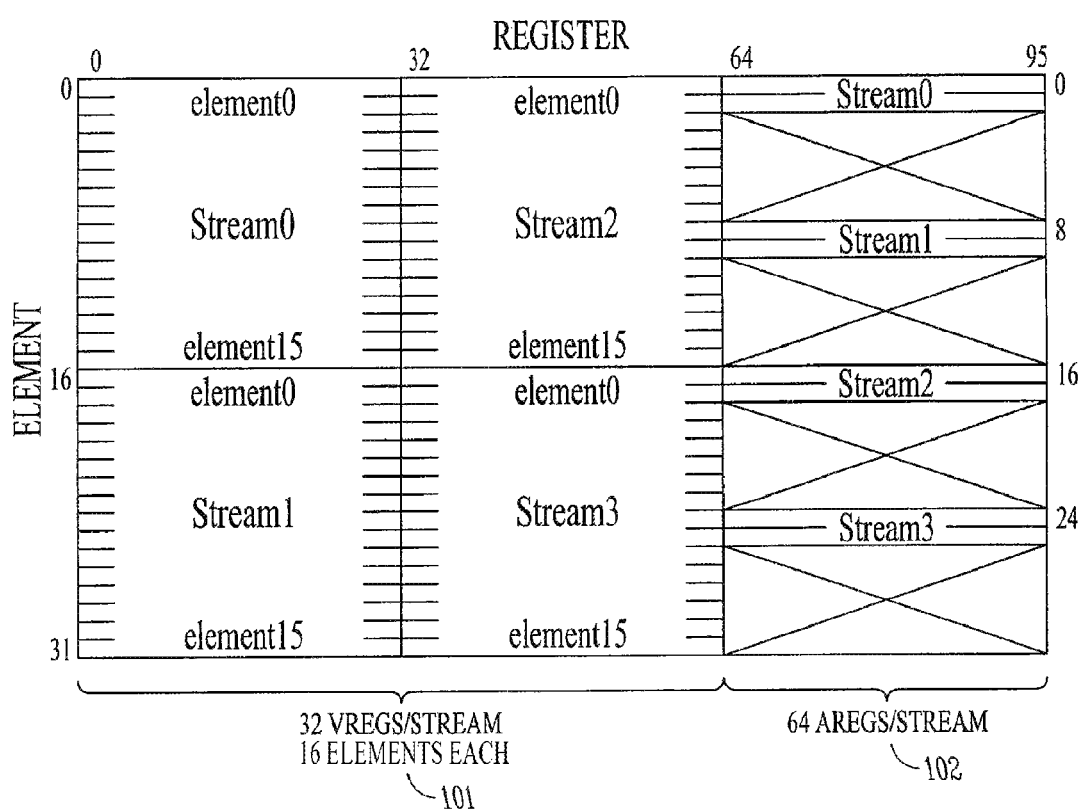
FIG. 1 shows a reconfigurable vector space supporting four streams and a vector length of 16, consistent with an example embodiment of the invention.
Figure 2:
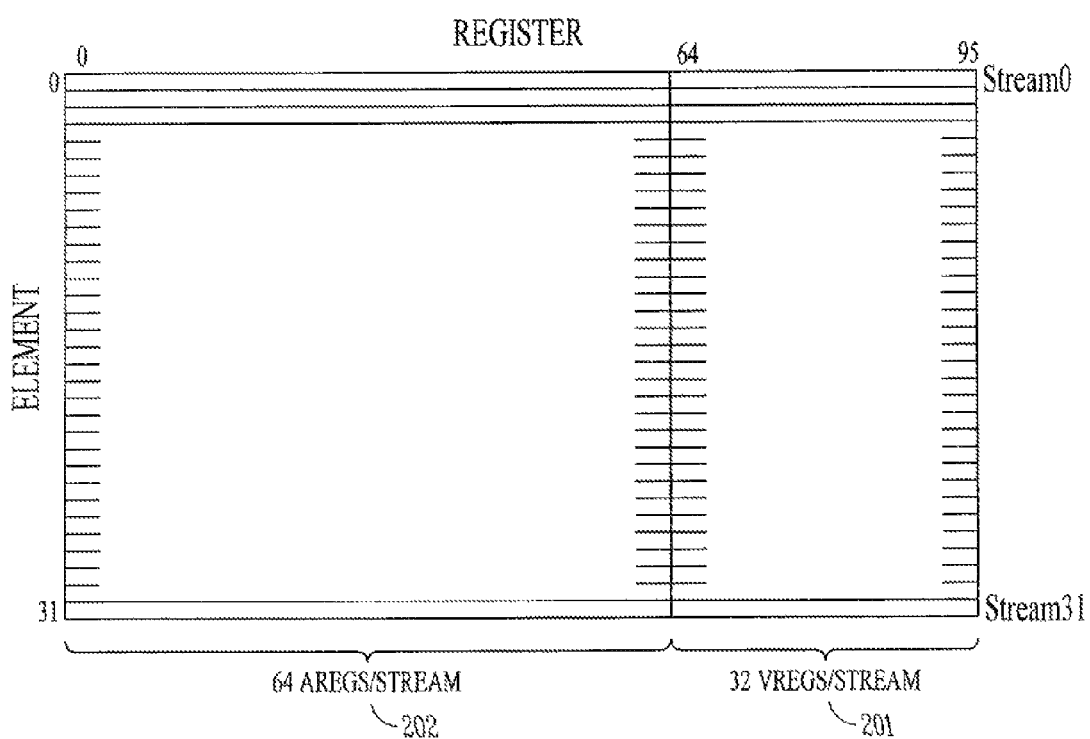
FIG. 2 shows a reconfigurable vector space supporting 32 streams and a vector length of one, consistent with an example embodiment of the invention.

In one such example illustrated in FIGS. 1 and 2, the vector registers and address registers allocated to different numbers of instruction streams are shown, demonstrating how an example register space is configured to facilitate changing vector modes. In this example, 3,072 registers are organized as 96 registers with 32 elements each. FIG. 1 shows the example register space configured to support four streams having a maximum vector length of 16, whereas FIG. 2 illustrates the same register space configured to support 32 streams with a maximum vector length of one.

Vector registers allocated to each of four different instruction streams of the four-stream 16-element vector configuration are shown at 101, each stream being allocated 32 registers having 16 elements each, such that there is a maximum vector length of 16. Address registers for each stream are allocated in register space 102, but only consume two elements of 32 registers per stream—the remaining register space that is crossed out is unused in this vector mode.

In FIG. 2, the same vector register space is configured such that each of 32 streams is allocated vector register space having 32 elements each, for a total of 1024 registers. The remaining 2048 registers are allocated as address registers as shown at 202, such that each of the 32 streams is allocated 64 address registers.

Figure 3:
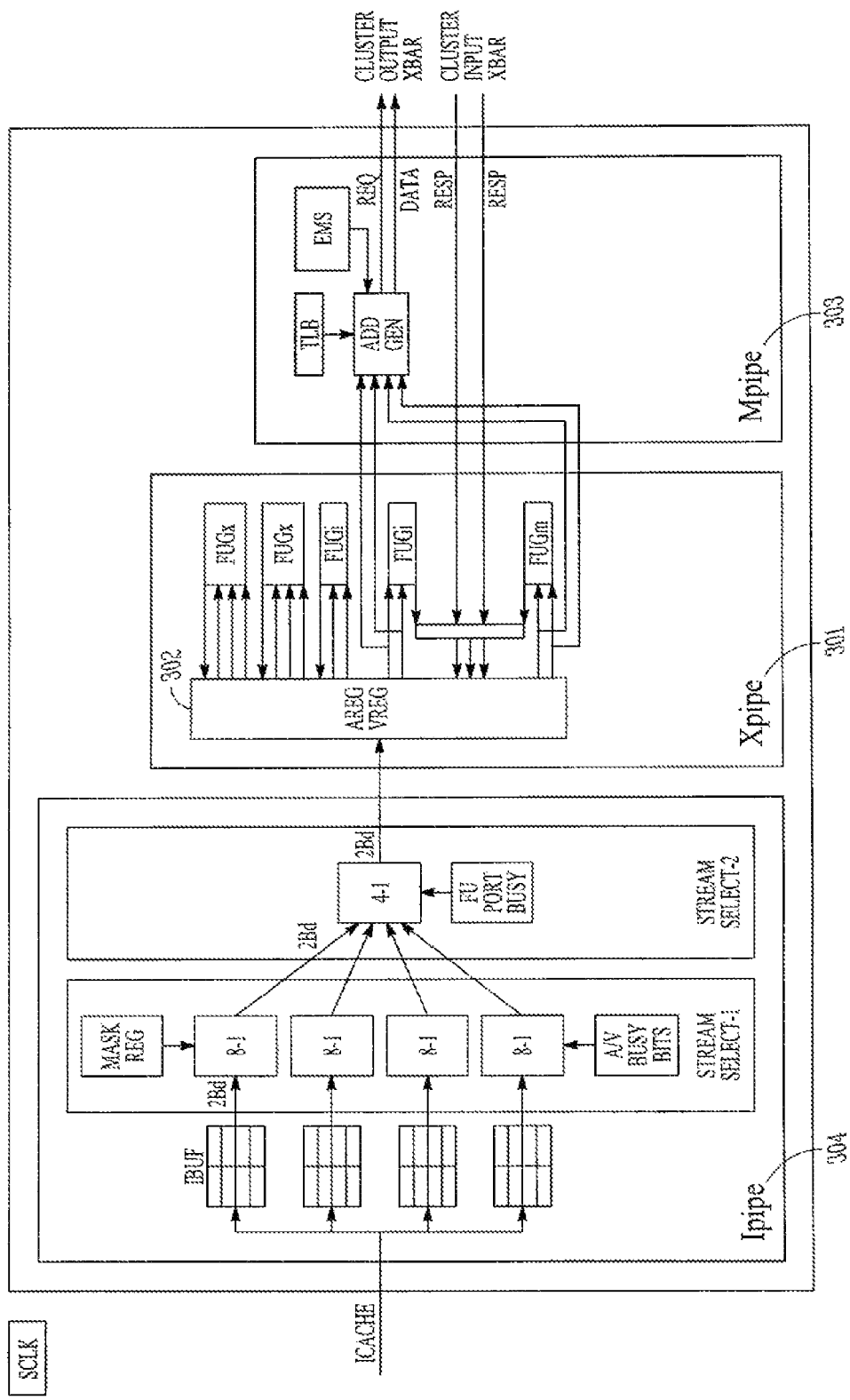
FIG. 3 shows a vector processor having configurable vector modes, consistent with an example embodiment of the invention.

In this example embodiment, the address registers and vector registers are a part of a processor core, as shown in FIG. 3. Here, the XPipe element is the execution pipeline, as shown at 301, and includes the address register/vector register space shown in FIGS. 1 and 2 at 302 in FIG. 3. The MPipe, or memory pipeline that includes the load/store unit of the processor is shown at 303, and the IPipe or instruction pipeline is shown at 304. The instruction pipeline includes the instruction buffers and cache, and the instruction fetch and issue logic.

To change modes between fine-grained parallel applications that benefit from running in a 32-stream mode and coarse-grained parallel applications that benefit from the longer vector length of the 4-stream mode, the processor core quiets all executing threads in the core being reconfigured, and flushes the registers. The registers and instruction pipelines are reloaded under the new vector/stream mode, and execution is restarted.

Changing modes therefore involves repartitioning the register space and reassignment of registers to different streams, or between vector and address register allocation, depending on the embodiment being practiced. The actual register space remains the same, as is illustrated in the example of FIGS. 1 and 2, and the IPipe system remains the same but switches between four and 32 instruction streams based on the selected mode. A variety of other necessary or optional changes, such as changing a maxVL or maximum vector length register to reflect the new configured maximum vector length, are also employed in some embodiments, and are within the scope of the invention.

The processor of this example can therefore be configured for fine-grained or coarse-grained parallelism on the fly, even within an executing application. The ability to configure the processor core on the fly, even within a job or application, provides greater flexibility and efficiency in execution than prior systems could provide. Further, the ability to switch modes on a core-by-core basis rather than on a system-by-system basis or chip-by-chip basis enables configuration of individual cores to best suit the applications assigned to those specific cores. For example, a processor chip containing 32 cores can configure 28 cores to work on a coarse-grained parallel application using a vector length of 16, while the remaining four cores execute fine-grained threads that do not lend themselves to vector parallelization as well.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the example embodiments of the invention described herein. It is intended that this invention be limited only by the claims, and the full scope of equivalents thereof.

What is claimed is:

1. A processor chip, comprising:
a plurality of processor cores including a first processor core and a second processor core and a plurality of register spaces including a first register space connected to the first core and a second register space connected to the second core, wherein the register space of each respective one of the plurality of cores, when the respective core is in a first vector mode, is configured as a first plurality of registers used as a plurality of sets of vector registers that each includes a plurality of vector registers and a second plurality of registers used as a plurality of sets of address registers that each includes a plurality of address registers, and wherein, when the respective core is in a second vector mode, the register space of the respective core is reconfigured such that at least some of its registers that were used as address registers in the first vector mode are instead used as vector registers in the second vector mode, wherein each one of the plurality of processor cores operates on a plurality of instruction streams, wherein each instruction stream in each respective core operates using one of the plurality of sets of address registers for that respective core and one of the plurality of sets of vector registers for that respective core, wherein each respective processor core has a selectable maximum vector length specifying a maximum number of elements in each vector register in that core, wherein the selectable vector length is one or more elements, and wherein each one of the plurality of processor cores is operable to change between the first vector mode having a first maximum vector length and the second vector mode having a second maximum vector length, and wherein the second maximum vector length is longer than the first maximum vector length.

2. The processor chip of claim 1, wherein each one of the plurality of processor cores is further operable to change the number of instruction streams operating in that processor core, while keeping constant the number of vector registers in each set in the plurality of sets of vector registers and keeping constant the number of address registers in each set in the plurality of sets of address registers.

3. The processor chip of claim 1, wherein each one of the plurality of processor cores is operable to change the maximum vector length by changing vector register allocation in the register space such that a portion of the register space of a particular core used for address registers in one vector mode is instead used for vector registers in another vector mode.

4. The processor chip of claim 1, wherein each one of the plurality of processor cores is operable to change the maximum vector length by changing instruction issue mode.

5. The processor chip of claim 1, wherein each of the plurality of processor cores is independently operable to change vector modes on a core-by-core basis.

6. The processor chip of claim 1, wherein changing vector modes in the first processor core comprises halting all instruction stream execution in the first processor core, flushing one or more registers in the register space of the first processor core, reconfiguring the plurality of vector registers in the register space of the first processor core, and restarting instruction execution in the first processor core.

7. The processor chip of claim 1, wherein changing vector modes in the first processor core comprises using the same instruction set architecture having a constant number of vector registers and a constant number of address registers in different vector modes.

8. A multiprocessor computer system, comprising:
a plurality of processing nodes, each node comprising a plurality of local processor cores and a plurality of register spaces, wherein, when one of the plurality of local processor cores is in a first vector mode, the register space of that core includes a first plurality of registers used as a plurality of sets of vector registers and a second plurality of registers used as a plurality of sets of address registers, and wherein, when one of the plurality of local processor cores is in a second vector mode, the register space of the respective core is reconfigured such that at least some of its registers that were used as address registers in the first vector mode are instead used as vector registers in the second vector mode, wherein each one of the plurality of local processor cores operates on a plurality of instruction streams, wherein each one of the plurality of local processor cores includes one of the plurality of register spaces, wherein each respective local processor core has a selectable maximum vector length specifying a number of elements in each vector register of the plurality of sets of vector registers, wherein the selectable vector length is one or more elements, and wherein each of the plurality of local processor cores is operable to change between a first vector mode having a first maximum vector length and the second vector mode having a second maximum vector length longer than the first maximum vector length.

9. The multiprocessor computer system of claim 8, wherein each one of the plurality of local processor cores is further operable to change a number of instruction streams operating in that processor core, while keeping constant the number of vector registers in each set in the plurality of sets of vector registers and keeping constant the number of address registers in each set in the plurality of sets of address registers.

10. The multiprocessor computer system of claim 8, wherein each one of the plurality of local processor cores is operable to change the maximum vector length by changing vector register allocation in a register space such that a portion of the register space of a particular core used for address registers in one vector mode is instead used for vector registers in another vector mode.

11. The multiprocessor computer system of claim 8, wherein each one of the plurality of local processor cores is operable to change the maximum vector length by changing instruction issue mode.

12. The multiprocessor computer system of claim 8, wherein the plurality of local processor cores includes a first local processor core, and wherein changing vector modes in the first local processor core comprises halting all instruction stream execution in the first local processor core, flushing one or more registers in the register space of the first processor core, reconfiguring the plurality of vector registers in the register space of the first local processor core, and restarting instruction execution in the first local processor core.

13. The multiprocessor computer system of claim 8, wherein the plurality of local processor cores includes a first local processor core, and wherein changing vector modes in the first local processor core comprises using the same instruction set architecture having a constant number of vector registers and a constant number of address registers in different vector modes.

14. The multiprocessor computer system of claim 8, wherein the plurality of local processor cores are operable to independently change vector modes on a core-by-core basis.

15. A method of operating a vector computer processor, wherein the vector computer processor includes a plurality of processor cores including a first processor core and a second processor core and a plurality of register spaces, each register space including a first plurality of registers used as a plurality of sets of vector registers and a plurality of sets of address registers, and wherein each set of address registers includes a plurality of address registers and each set of vector registers includes a plurality of vector registers, wherein each one of the plurality of processor cores includes a respective one of the plurality of register spaces, wherein each respective processor core has a selectable maximum vector length specifying a number of elements in each vector register of the plurality of sets of vector registers, wherein the selectable vector length is one or more elements, the method comprising:

operating on a plurality of instruction streams in each one of the plurality of processor cores, configuring the register space of each respective one of the plurality of processor cores to support one of the plurality of sets of vector registers and one of the plurality of sets of address registers for each of the plurality of instruction streams being operated on in the respective processor core, in the first processor core, changing between a first vector mode having a first maximum vector length and a second vector mode having a second maximum vector length and reconfiguring the register space of the first processor core such that at least some of its registers that were used as address registers in the first vector mode are instead used as vector registers in the second vector mode, wherein the second maximum vector length is longer than the first maximum vector length.

16. The method of operating a vector computer processor of claim 15, wherein the changing between the first vector mode and the second vector mode is initiated by an application.

17. The method of operating a vector computer processor of claim 15, wherein the changing between the first vector mode and the second vector mode in one of the processor cores comprises changing a number of instruction streams operating in that processor core, while keeping constant the number of vector registers in each set in the plurality of sets of vector registers and keeping constant the number of address registers in each set in the plurality of sets of address registers.

18. The method of operating a vector computer processor of claim 15, wherein the changing between the first vector mode and the second vector mode in the first processor core comprises halting all instruction stream execution in the first processor core, flushing one or more registers in the register space of the first processor core, reconfiguring one or more vector registers in the register space of the first processor core, and restarting instruction execution in the first processor core.

19. The method of operating a vector computer processor of claim 15, further comprising independently operating the plurality of processor cores to change vector modes on a core-by-core basis.

20. The method of operating a vector computer processor of claim 15, wherein the changing between the first vector mode and the second vector mode comprises using the same instruction set architecture having a constant number of vector registers and a constant number of address registers in different vector modes.

21. The method of operating a vector computer processor of claim 15, wherein the vector computer processor has the plurality of processor cores on a chip;

wherein, in each of the plurality of processor cores, each set of address registers has sixty-four address registers when operating in the first vector mode and each set of address registers has sixty-four address registers when operating in the second vector mode;

wherein, in each of the plurality of processor cores, the second vector mode can handle four streams, wherein each stream in the second vector mode has a maximum vector length of sixteen elements, and wherein each element is a 64-bit word; and wherein, in each of the plurality of processor cores, the first vector mode can handle thirty-two streams, wherein each stream in the first vector mode has a maximum vector length of one element.

22. The processor chip of claim 1, wherein each register space includes a second plurality of registers, wherein the register space of each respective processor core is configurable to support a separate plurality of address registers for each of the plurality of instruction streams being operated on in the respective processor core, wherein in each of the plurality of processor cores, each set of address registers has sixty-four address registers when operating in the first vector mode and each set of address registers has sixty-four address registers when operating in the second vector mode;

in the first vector mode the first vector length is one and in the second vector mode the second vector length is longer than one, and wherein each respective processor core executes the same instruction set architecture that uses the same first number of vector registers for each instruction stream in both the first vector mode and in the second vector mode, and that uses the same second number of address registers for each instruction stream in both the first vector mode and in the second vector mode.

23. The processor chip of claim 22, wherein in the first vector mode the first plurality of registers is configured as the same first number of vector registers for each of the plurality of instruction streams, each of the vector registers having the first number of elements, and the second plurality of registers is configured as the same second number of address registers for each of the plurality of instruction streams, and wherein in the second vector mode the first plurality of registers is configured as the same second number of address registers for each of the plurality of instruction streams and the second plurality of registers is configured as the same first number of vector registers for each of the plurality of instruction streams, each of the vector registers having the second number of elements.

24. The method of operating a vector computer processor of claim 15, wherein the changing between the first vector mode and the second vector mode such that a portion of the register space of a particular core used for address registers in one vector mode is instead used for vector registers in another vector mode is initiated by an operating system.

25. The method of operating a vector computer processor of claim 15, wherein the changing between the first vector mode and the second vector mode such that a portion of the register space of a particular core used for address registers in one vector mode is instead used for vector registers in another vector mode is initiated by a batch system.

26. The method of operating a vector computer processor of claim 15, wherein the changing between the first vector mode and the second vector mode such that a portion of the register space of a particular core used for address registers in one vector mode is instead used for vector registers in another vector mode is initiated by a processor core.

27. The method of operating a vector computer processor of claim 15, wherein the changing between the first vector mode and the second vector mode comprises changing vector register allocation in a register space.

28. The method of operating a vector computer processor of claim 15, wherein the changing between the first vector mode and the second vector mode comprises changing instruction issue mode.

* * * * *